E. P. WHEELER.
Fire-Kindlers.
No. 143,048. Patented September 23, 1873.
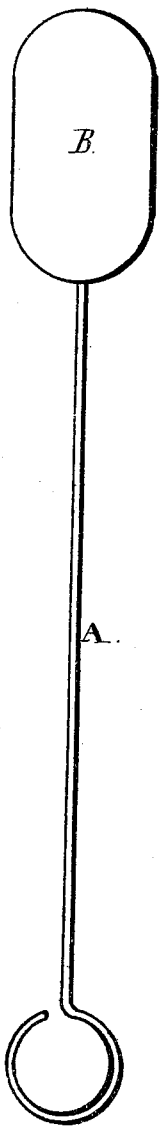
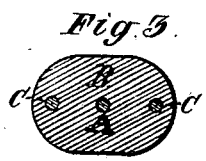
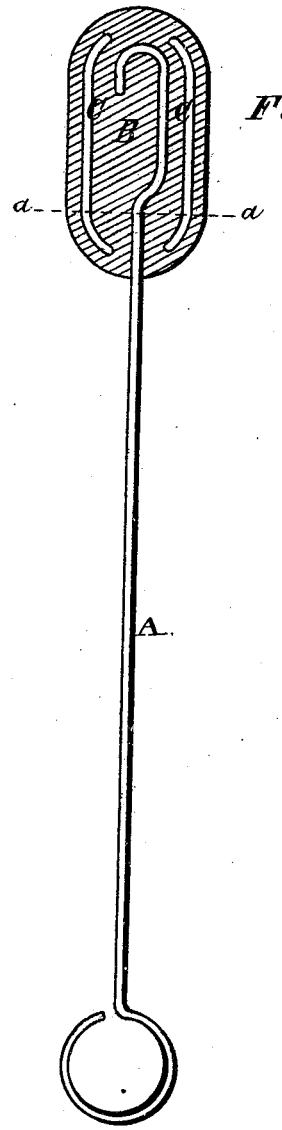
Witnesses
Alexander Lynch.
Inventor
Edward P. Wheeler

UNITED STATES PATENT OFFICE.

EDWARD P. WHEELER, OF CORINTH, MISSISSIPPI.

IMPROVEMENT IN FIRE-KINDLERS.

Specification forming part of Letters Patent No. 143,048, dated September 23, 1873; application filed August 27, 1873.

*To all whom it may concern:*

Be it known that I, EDWARD P. WHEELER, of Corinth, in the county of Alcorn and State of Mississippi, have invented certain new and useful Improvements in Fire-Kindlers; and I do hereby declare the following to be a full, clear, and exact description of the invention, such as will enable others skilled in the art to which it pertains to make and use it, reference being had to the accompanying drawings, which form part of this specification.

The object of my invention relates to a fire-kindler, entirely free from explosion; and consists in the composition of several mineral substances which, when compounded together as hereinafter described, forms a bulb that is not only porous and capable of taking up and retaining any inflammable fluid, but will sustain any ordinary heat to which it may be subjected without injury to the same, and can be repeatedly ignited for the purpose of kindling a fire, as a substitute for kindling-wood.

Figure 1 is a plan view of a fire-kindling composed of the improved composition of matter. Fig. 2 is a sectional plan, and Fig. 3 is a transverse sectional view, showing a method of attaching the composition to a handle for use.

To prepare the composition, take pure clay, asbestus, and furnace-slag, pulverized and mixed together, adding sufficient water to bring the ingredients to a consistency to be molded in any form or shape desired, when it is placed in an oven and baked until hard. It is then ready for use; but previous to kindling a fire the bulb should be submerged for a few moments in any inflammable liquid, such as coal-oil, spirits of turpentine, &c., then ignited and placed between the bars or grates of a stove or furnace to kindle a fire, after which it can be withdrawn, to be used again in the same manner, and as often as desired, by submerging the kindler or bulb each time in the inflammable liquid.

The object of compounding furnace-slag with asbestus and clay, is to give to the bulb a greater porosity, and at the same time increase its consistency and durability to withstand any heat to which it may be subjected without injury to the bulb or danger of explosion. By furnace-slag, I mean the light porous slag as thrown off under the first blast in the working of blast-furnaces. It resembles pumice-stone.

The object of using clay is to give the bulb consistency. Asbestus is used to add durability in withstanding heat or repeated heatings, while the addition of furnace-slag gives to the bulb porosity, and adds both to its durability and consistency.

I make no claim whatever to its mechanical construction; but

What I claim as new and useful, and desire to secure by Letters Patent, is—

A fire-kindler composed of clay, asbestus, and furnace-slag, substantially as and for the purpose hereinbefore set forth.

In testimony that I claim the foregoing I have hereunto set my hand this 26th day of August, 1873.

EDWARD P. WHEELER.

Witnesses:
 G. J. FERRIS,
 BENJAMIN N. MEEDS.